J. W. UPSON.
Animal Tether.
No. 104,667 Patented June 21, 1870
2 Sheets—Sheet 1.
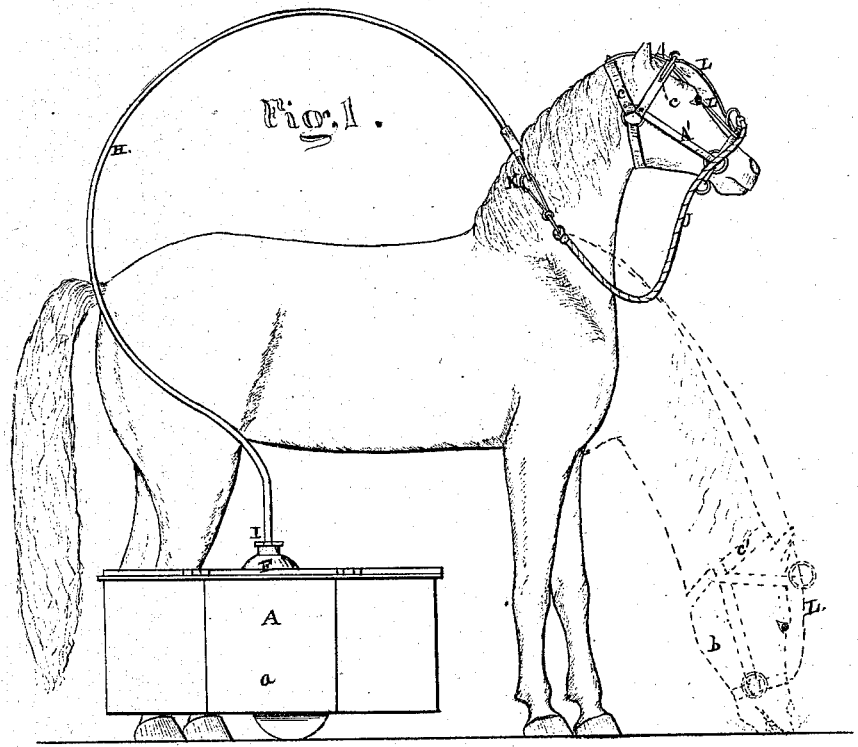
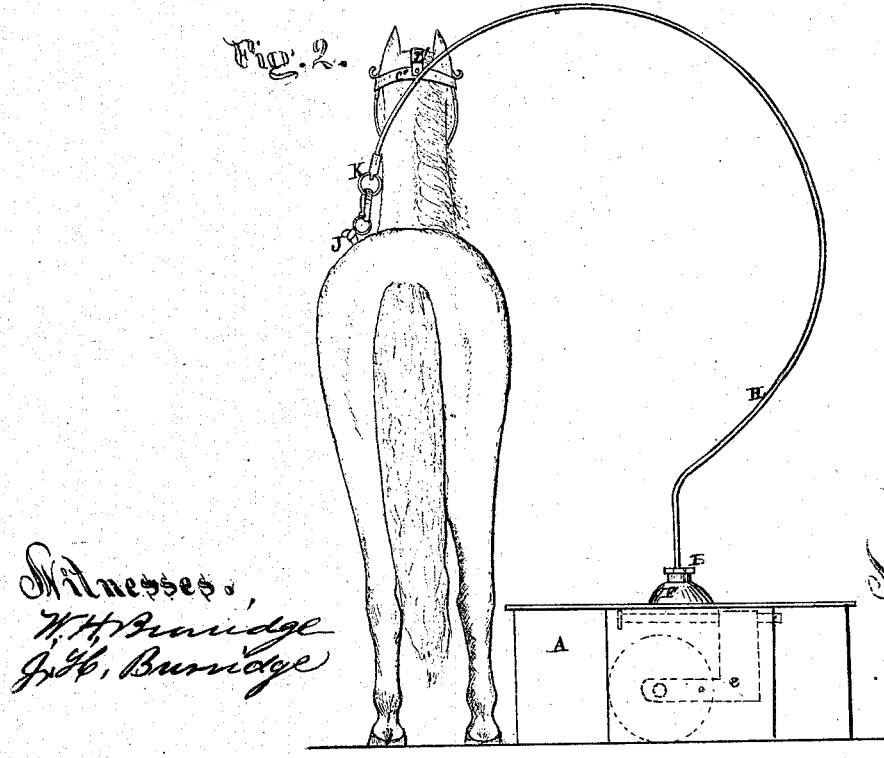

2 Sheets—Sheet 2.
J. W. UPSON.
Animal Tether.
No. 104,667        Patented June 21, 1870
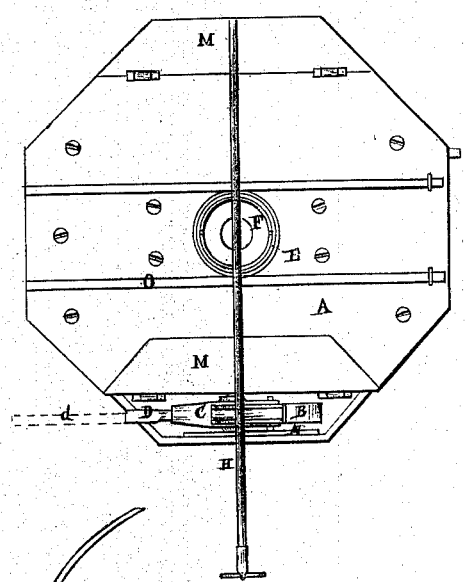
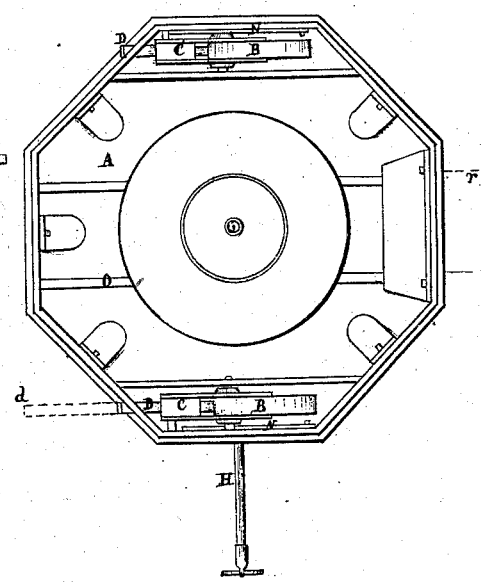
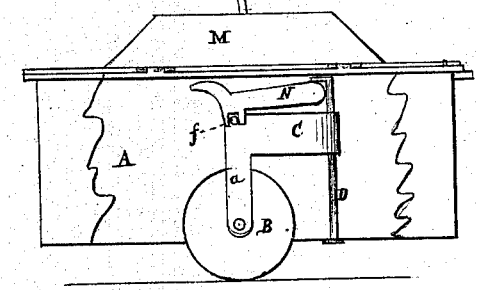
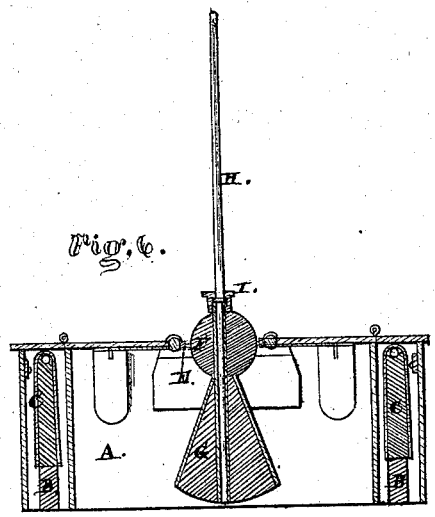
Witnesses.
Inventor.

UNITED STATES PATENT OFFICE.

JAMES W. UPSON, OF TALLMADGE, OHIO.

IMPROVED ANIMAL-TETHER.

Specification forming part of Letters Patent No. 104,667, dated June 21, 1870.

*To all whom it may concern:*

Be it known that I, JAMES W. UPSON, of Tallmadge, in the county of Summit and State of Ohio, have invented a certain new and Improved Animal-Tether; and I do hereby declare that the following is a full, clear, and complete description of the same, reference being had to the accompanying drawing, making part of this specification, in which drawing—

Figure 1 is a side view of the horse and tether; Fig. 2, a rear view of the horse and tether; Fig. 3, a top view of the tether; Fig. 4, a view of the under side; Fig. 5, a side view of the inside; Fig. 6, a vertical transverse section.

Like letters refer to like parts in the several views.

The nature of this invention relates to a movable tether, provided with an adjustable counterbalanced sweep, to which the animal is secured while feeding, and in such a way that it cannot become entangled in the tether by getting its feet caught therein, or by twisting it about the head or neck. The tether is also so constructed that it may be moved from place to place on rollers, arranged and operated as herein more fully described.

In Fig. 1, A represents an octagonal-sided case, a top view of which is shown in Fig. 3, which, however, may be of any other shape desired and of any considerable size. On each of two opposite sides within said case is a wheel or roller, B, secured in place and adjusted therein by a right-angled stay, C, Fig. 5, in which it is journaled. Said stay is pivoted to the side of the case at the point *a*, and is made to vibrate therein by a lever or bar, D, secured to the free or upper limb of the stay by means of a sleeve, in which the lever is inserted and made to slide, as and for a purpose hereinafter shown. In the center of the top of the case is cut a hole, in which is pivoted a ring or zone, E, at each end of its diameter, and thereby allowed to vibrate in said hole. Within said ring is pivoted a ball, F, in like manner as the ring, and in which it vibrates transversely to that of the ring. By this means is obtained to the ball a rolling, vibrating-like movement in all directions, the purpose of which will presently be shown. At the lower pole of the ball is attached a counter-balance or weight, G, Fig. 6, and to the upper pole of the same is secured a curved spring-sweep, H, Figs. 1 and 2. Said sweep is so attached to the ball, by means of a collar, I, Fig. 6, as to allow to it a rotating movement around the axis of its length.

As above said, this apparatus is for the purpose of a tether, whereby a horse or other animal is restrained from wandering while temporarily feeding. The animal, which, in the present instance, is a horse, and represented in Fig. 1, is tied to the extreme end of the sweep by a tether, J, fastened thereto in a swiveled ring, K. The tether lies upon the ground, as shown in Fig. 2, while the horse is feeding, as indicated by the dotted outlines *b* of the head in Fig. 1.

It will be obvious that while the animal's head is down, in the act of feeding, it draws upon the tether more or less, as the distance that the creature may be from the tether, which will be at all times drawn taut, or so much so as to prevent it from hanging loosely from the end of the sweep, which, by virtue of the elastic character of said sweep and the counter-balance, it will at all times be inclined to a vertical position, as shown in Figs. 1 and 2, thereby keeping the tether slightly strained and straight, but not to a degree of tightness to inconvenience the horse while feeding. By this means the tether is above and out of the way of the animal's feet; hence they cannot become entangled therein, which they would be liable to become if the tether hung low and loosely about the animal's limbs.

For further protection against the danger of entanglement of the horse in the tether, the sweep is largely curved, so that the animal, on moving backward, will pass under the sweep, as shown in Fig. 2, it being sufficiently high to admit of all freedom of movement to the animal without his coming in contact therewith to the extent of embarrassing his movements or to cause alarm.

It will be observed that the tether is not secured to the horse at or near the mouth by means of a halter, A', and ring, in the ordinary way, but is attached thereto by means of a rod, L, Fig. 1, the lower end of which is secured to the nose-band of the halter, whereas the upper end is secured to a bow, *c*, attached to the forehead-band, which allows to the tether a lateral movement below the base of the ears. The nose-band and the bar L are prevented from being pulled upward by a flat stay, L', Fig. 1, the lower end of which is connected to the nose-band, whereas its upper end is connected to the neck-band c' of the halter. Said stay not only prevents the band from being pulled upward, but it also protects the animal's face from the abrasion of the ring of the tether.

The purpose of this arrangement is to allow the end of the tether attached to the horse to slide upward from the mouth so as to be more out of the way of the animal's feet while his head is down, as shown in Fig. 1; and, by means of the bow attached to the forehead-band, the tether will slip to either side of the forehead, as the direction of the draft may be. By this device, together with the curved counterbalanced sweep above described, the tether is at all times held taut and away from the feet of the animal while feeding; hence there is no liability of his becoming entangled and cast by the tether.

It will be obvious that an animal tethered in the manner as above described can feed with complete freedom all around the tether, and to the extent of the length of the tether, as the sweep, by its several and ready movements, adapts itself to the various attitudes and places that the animal may take, without the least restraint in the freedom of its movements, while feeding or not.

The tether may be moved from place to place, as the condition of the grass may require, by raising it from the ground by means of the rollers and lever referred to, thus: On opening the cover M, Fig. 3, access is had to the lever D, which, when the tether is down, lies therein, as shown in Figs. 3 and 4.

Now, on drawing the lever out, as indicated by the dotted lines d, and then lifting it upward, the stay C will be changed from that indicated by the dotted lines e, Fig. 2, to that shown in Fig. 5, in which it will be seen that the wheels are on the ground and the tether elevated upon them by means of the stay, which is secured in this position by a pawl, N, attached to the side of the case, and made to engage a pin, t, projecting from the side of the stay.

The tether, thus elevated upon the rollers or wheels, can now be rolled from place to place by the handle O, Fig. 3, which may be drawn out from its grooves across the top of the tether, as indicated by the dotted lines r, and again lowered, when necessary, to the ground by reversing the movements of the stay, lever, &c.

A tether thus constructed is of easy management, convenient, and at all times reliable in securing the animal that may be tethered thereto, and when not in immediate use can be rolled to some place for storage, or to be out of the way.

What I claim as my invention, and desire to secure by Letters Patent, is—

1. The stay C, wheel B, lever D, and pawl N, as arranged in combination with the case A, in the manner as and for the purpose set forth.

2. The swivel and pointed sweep H, pivoted ball F, and pivoted ring E, in combination with the counter-balance G, as and for the purpose specified.

3. The rod L, bow c, in combination with the halter A', substantially as described, and for the purpose set forth.

J. W. UPSON.

Witnesses:
J. H. BURRIDGE,
W. H. BURRIDGE.